US011895761B2

(12) United States Patent
Jeong et al.

(10) Patent No.: US 11,895,761 B2
(45) Date of Patent: Feb. 6, 2024

(54) COOKING APPARATUS AND METHOD OF CONTROLLING THE SAME

(71) Applicant: Samsung Electronics Co., Ltd., Suwon-si (KR)

(72) Inventors: Jiho Jeong, Suwon-si (KR); Jeawon Lee, Suwon-si (KR); Seunggee Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 17/156,355

(22) Filed: Jan. 22, 2021

(65) Prior Publication Data

US 2021/0235554 A1 Jul. 29, 2021

(30) Foreign Application Priority Data

Jan. 23, 2020 (KR) ........................ 10-2020-0009296

(51) Int. Cl.
*H05B 6/64* (2006.01)
*F24C 7/08* (2006.01)

(52) U.S. Cl.
CPC ........... *H05B 6/6482* (2013.01); *F24C 7/087* (2013.01); *H05B 6/6447* (2013.01)

(58) Field of Classification Search
CPC ...... H05B 6/6482; H05B 6/80; H05B 6/6447; F24C 7/087; F24C 7/085
See application file for complete search history.

(56) References Cited

U.S. PATENT DOCUMENTS

| | | | |
|---|---|---|---|
| 10,223,933 B1 | 3/2019 | Cheng et al. | |
| 2016/0381742 A1 | 12/2016 | Banavara | |
| 2017/0223774 A1* | 8/2017 | Cheng | F24C 15/22 |
| 2017/0238749 A1 | 8/2017 | Vengroff et al. | |
| 2018/0202667 A1 | 7/2018 | Cheng | |
| 2018/0242402 A1* | 8/2018 | Jeong | H05B 3/688 |
| 2018/0253459 A1 | 9/2018 | Srinivasan Natesan et al. | |
| 2020/0234702 A1 | 7/2020 | Shin et al. | |
| 2020/0345175 A1* | 11/2020 | Sonego | F24C 15/166 |

FOREIGN PATENT DOCUMENTS

| | | |
|---|---|---|
| JP | 2004-220414 A | 8/2004 |
| JP | 2017106692 A | 6/2017 |
| JP | 2019052843 A | 4/2019 |

(Continued)

OTHER PUBLICATIONS

International Search Report of the International Searching Authority in connection with International Application No. PCT/KR2021/000927 dated May 24, 2021, 4 pages.

*Primary Examiner* — Thien S Tran

(57) ABSTRACT

A cooking apparatus of the disclosure includes a heat source configured to provide heat into a cooking chamber. The cooking apparatus also includes a communication interface configured to receive recipe data including first output information of a reference cooking apparatus from a server. The cooking apparatus further includes a memory configured to store second output information of the cooking apparatus. Additionally, the cooking apparatus includes a processor configured to change an operation setting of the heat source included in the recipe data based on a difference between the first output information and the second output information.

16 Claims, 14 Drawing Sheets

(56) References Cited

FOREIGN PATENT DOCUMENTS

| | | | | | |
|---|---|---|---|---|---|
| KR | 10-1376804 | B1 | | 3/2014 | |
| KR | 10-1457087 | B1 | | 10/2014 | |
| KR | 10-2017-0137593 | A | | 12/2017 | |
| KR | 10-1920068 | B1 | | 2/2019 | |
| KR | 10-2019-0024114 | A | | 3/2019 | |
| WO | WO-2020014159 | A1 | * | 1/2020 | .............. F24C 7/085 |
| WO | WO-2020191186 | A1 | * | 9/2020 | ............... A23L 5/15 |

* cited by examiner

<ON-OFF TIME SETTING>

<COOKING TIME SETTING>

COOKING APPARATUS AND METHOD OF CONTROLLING THE SAME

CROSS-REFERENCE TO RELATED APPLICATION

This application is based on and claims priority under 35 U.S.C. § 119 to Korean Patent Application No. 10-2020-0009296, filed on Jan. 23, 2020, the disclosure of which is incorporated herein by reference.

BACKGROUND

1. Field

The disclosure relates to a cooking apparatus and a method of controlling the same.

2. Description of Related Art

A cooking apparatus is an apparatus for cooking by heating a cooking object such as food, and means an apparatus capable of providing various functions related to cooking, such as heating, defrosting, drying, and sterilization of the cooking object. Examples of such a cooking apparatus include, for example, an oven such as a gas oven or an electric oven, a microwave heating device (hereinafter, referred to as a microwave oven, microwave), a gas stove, an electric stove, a gas grill, or an electric grill.

In general, an oven is a device that cooks food by directly transferring heat to food through a heat source that generates heat such as a heater or by heating the inside of a cooking chamber, and a microwave oven is a device that cooks food by frictional heat between molecules generated by disturbing the molecular arrangement of food by using a high frequency as a heat source.

Meanwhile, a recent cooking apparatus may obtain recipe data from outside and automatically perform cooking based on the obtained recipe data. However, if an output of an apparatus used when generating the recipe data and an output of the cooking apparatus that actually cooks are different, there is a problem that cooking failure occurs.

SUMMARY

An aspect of the disclosure provides a cooking apparatus capable of comparing first output information of recipe data with second output information of the cooking apparatus, and automatically controlling a heat source so that a heat source of the cooking apparatus operates properly according to the comparison result, and a method of controlling the cooking apparatus.

Additional aspects of the disclosure will be set forth in part in the description which follows and, in part, will be appreciated from the description, or may be learned by practice of the disclosure.

According to an aspect of the disclosure, there is provided a cooking apparatus including: a heat source configured to provide heat into a cooking chamber; a communication interface configured to receive recipe data including first output information of a reference cooking apparatus from a server; a memory configured to store second output information of the cooking apparatus; and a processor configured to change an operation setting of the heat source included in the recipe data based on a difference between the first output information and the second output information.

The main controller may be configured to: identify a first output value of the reference cooking apparatus from the first output information and obtain a difference between the first output value and a second output value of the cooking apparatus included in the second output information; and based on the difference between the first output value and the second output value, change an on-off time of the heat source, change an operation output of the heat source, or determine a second cooking time different from a first cooking time of the recipe data.

Based on the case where the first output value is less than the second output value, the processor may be configured to change the on-off time of the heat source within the first cooking time of the recipe data.

Based on the case where the first output value is less than the second output value, the processor may be configured to determine the operation output of the heat source as the first output value.

Based on the case where the first output value is greater than the second output value, the processor may be configured to determine the second cooking time to be longer than the first cooking time of the recipe data.

Based on the case where the first output value and the second output value are the same, the processor may be configured to control the heat source based on the first output information.

The cooking apparatus may further include a sensor configured to identify a current or voltage applied to the heat source. The processor may be configured to obtain the second output value of the cooking apparatus based on the current or voltage identified by the sensor.

The heat source may include a plurality of heaters disposed on the top of the cooking chamber. The processor may be configured to selectively change an operation setting of each of the plurality of heaters.

The heat source may further include a magnetron disposed under the cooking chamber and configured to provide a high frequency into the cooking chamber. The processor may be configured to selectively change the operation setting of each of the plurality of heaters and the magnetron.

According to another aspect of the disclosure, there is provided a method of controlling a cooking apparatus including: obtaining, by a processor, recipe data including first output information of a reference cooking apparatus from a server; obtaining, by the processor, second output information of the cooking apparatus from a memory; and changing, by the processor, an operation setting of a heat source included in the recipe data based on a difference between the first output information and the second output information.

The method may further include identifying, by the processor, a first output value of the reference cooking apparatus from the first output information and obtaining a difference between the first output value and a second output value of the cooking apparatus included in the second output information. The changing of the operation setting of the heat source may include, based on the difference between the first output value and the second output value, changing an on-off time of the heat source, changing an operation output of the heat source, or determining a second cooking time different from a first cooking time of the recipe data.

The changing of the operation setting of the heat source may include, based on the case where the first output value is less than the second output value, changing the on-off time of the heat source within the first cooking time of the recipe data.

The changing of the operation setting of the heat source may include, based on the case where the first output value is less than the second output value, determining the operation output of the heat source as the first output value.

The changing of the operation setting of the heat source may include, based on the case where the first output value is greater than the second output value, determining the second cooking time to be longer than the first cooking time of the recipe data.

The changing of the operation setting of the heat source may include, based on the case where the first output value and the second output value are the same, controlling the heat source based on the first output information.

The method may further include identifying, by a sensor, a current or voltage applied to the heat source; and obtaining, by the processor, the second output value of the cooking apparatus based on the identified current or voltage.

The changing of the operation setting of the heat source may include selectively changing, by the controller, an operation setting of each of a plurality of heaters disposed on the top of a cooking chamber.

The changing of the operation setting of the heat source may include selectively changing, by the controller, an operation setting of each of a plurality of heaters and a magnetron disposed under a cooking chamber.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
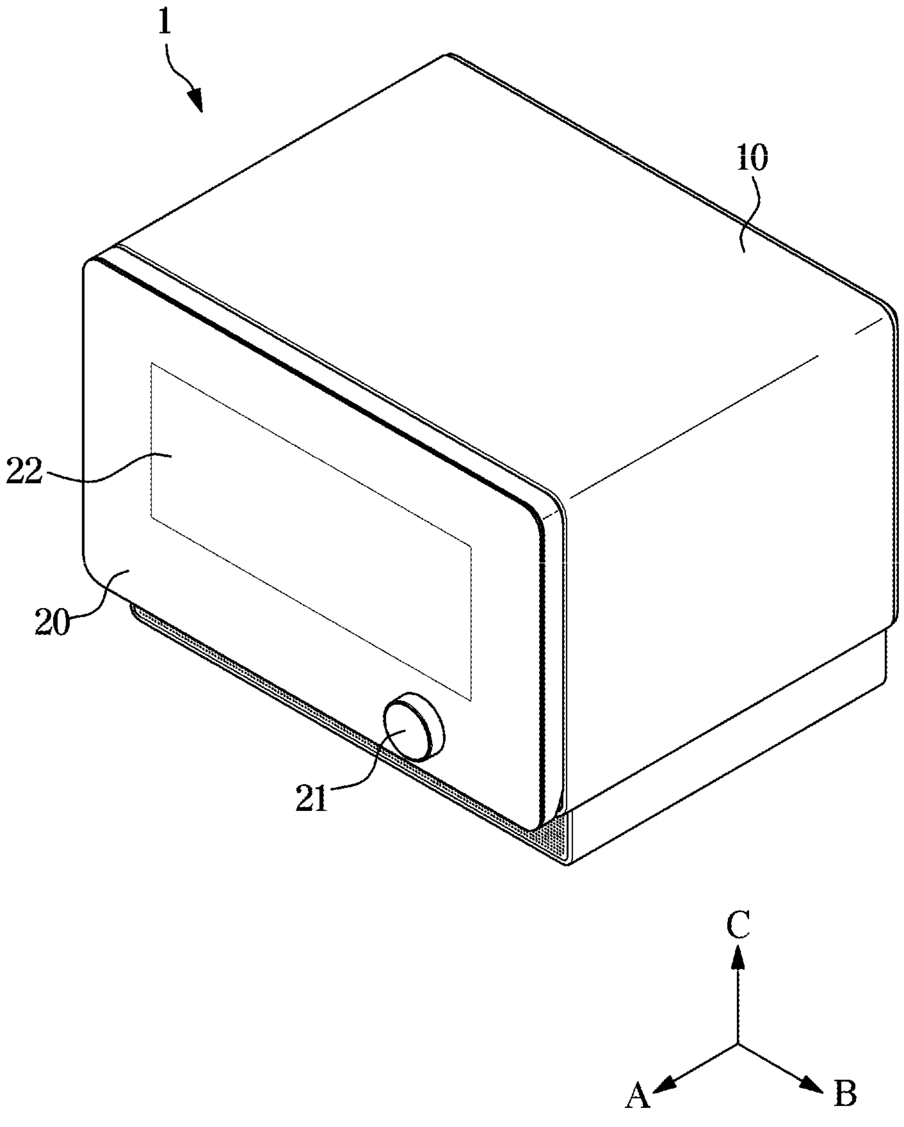
FIG. 1 is a perspective view illustrating a cooking apparatus according to an embodiment of this disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Configurations shown in the embodiments and drawings described herein are only embodiments of the disclosure, there may be various modifications that can replace the embodiments and drawings of the present specification at the time of filing of the present application.

In addition, the same reference numerals or signs in each of the drawings of the present specification represent parts or components that perform substantially the same function.

Also, the terminology used herein is for the purpose of describing particular embodiments only and is not intended to be limiting and/or restricting the disclosed embodiments. Singular expressions include plural expressions unless the context clearly indicates otherwise. In this specification, the terms “comprise” or “have” are intended to indicate that there is a feature, number, step, action, component, part, or combination thereof described in the specification, and one or more other features. It does not exclude in advance the possibility of the presence or the addition of numbers, steps, operations, components, parts or combinations thereof.

In addition, terms including ordinal numbers such as “first” and “second” as used herein may be used to describe various components, but the components are not limited by the terms. It is used only to distinguish one component from another. For example, without departing from the scope of the present disclosure, the first component may be referred to as the second component, and similarly, the second component may also be referred to as the first component. The term “and/or” includes any combination of a plurality of related items or any of a plurality of related items.

Terms such as “~ unit”, “~ group”, “~ block”, “~ member”, and “~ module” used in the specification may be implemented in software or hardware. Terms such as “~ unit”, “~ group”, “~ block”, “~ member”, and “~ module” may mean a unit that processes at least one function or operation. In addition, terms such as “~ unit”, “~ group”, “~ block”, “~ member”, and “~ module” are used in at least one piece of hardware, circuit, or at least one software or processor stored in a memory.

Throughout the specification, when a part is said to be “connected” with another part, this includes not only the case of being directly connected but also the case of being indirectly connected, and an indirect connection involves connecting through a wireless communication network.

In each step, the identification code is used for convenience of explanation, and the identification code does not describe the order of each step, and each step may be implemented differently from the specified order unless a specific order is clearly stated in the context.

Hereinafter, embodiments of the disclosure will be described in detail with reference to the accompanying drawings.

Figure 2:
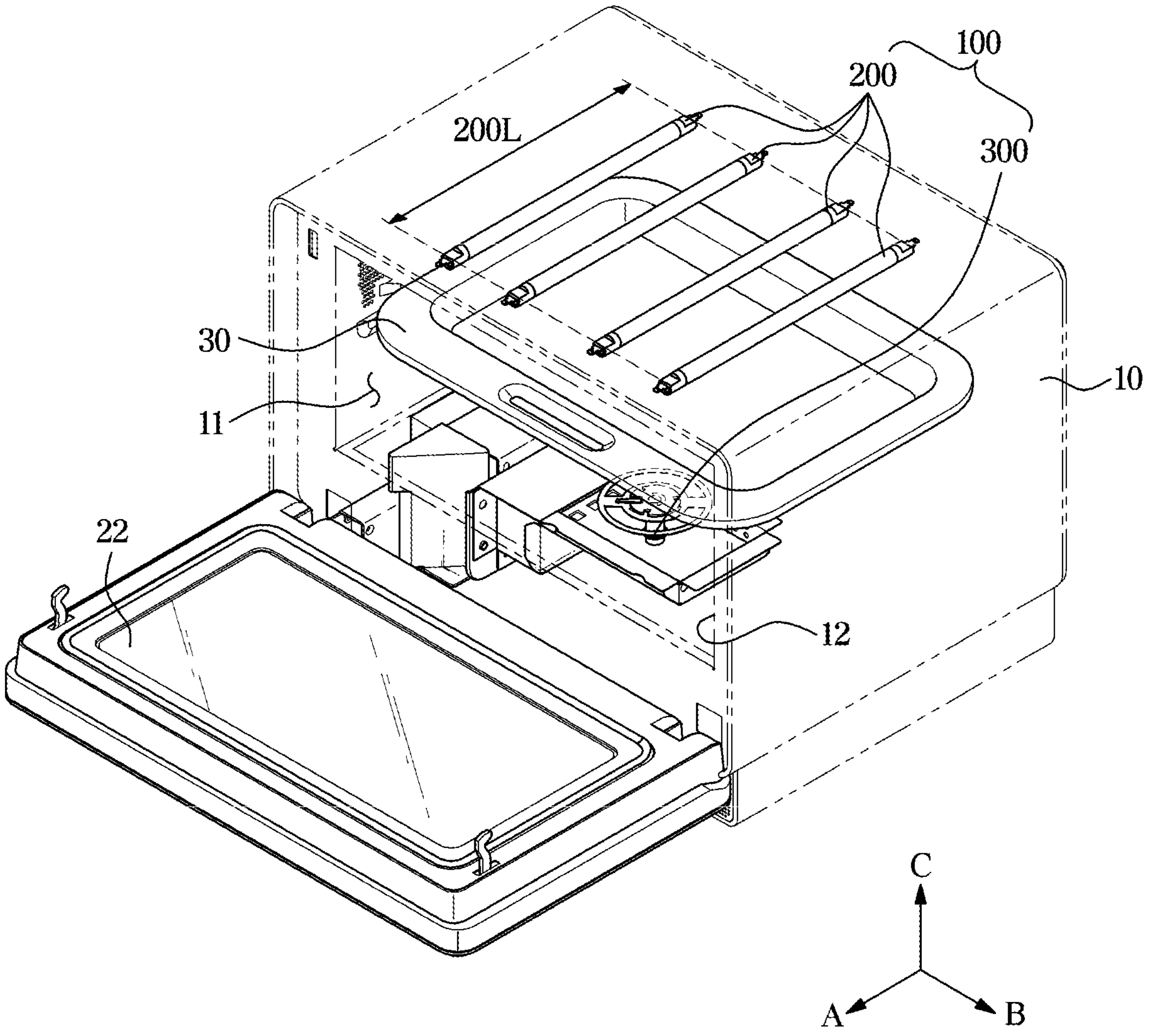
FIG. 2 is a view illustrating a partial configuration of the interior of a cooking apparatus according to an embodiment of this disclosure.
Figure 3:
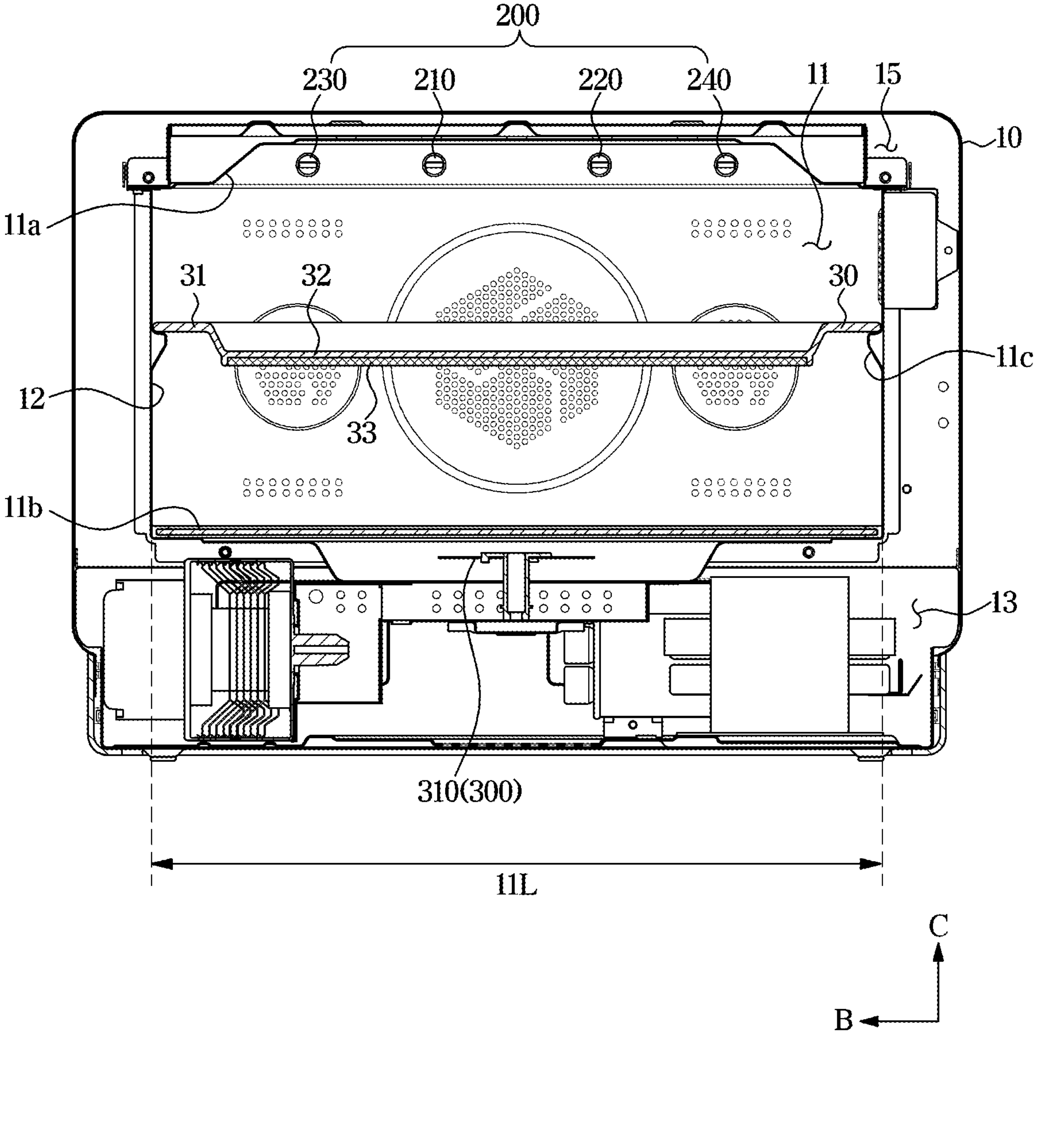
FIG. 3 is a cross-sectional view illustrating a cooking apparatus according to an embodiment of this disclosure.

FIG. 1 is a perspective view illustrating a cooking apparatus according to an embodiment of this disclosure, FIG. 2 is a view illustrating a partial configuration of the interior of a cooking apparatus according to an embodiment of this disclosure, and FIG. 3 is a cross-sectional view illustrating a cooking apparatus according to an embodiment of this disclosure.

Referring to FIG. 1, a cooking apparatus 1 may include a housing 10 forming an exterior, and a door 20 provided to open and close openings of the housing 10 and the inner housing 12.

The door 20 may include an input 21 for inputting a signal to allow a user to control the cooking apparatus 1. The input 21 is illustrated in the form of a jog dial, but is not limited thereto. For example, the input 21 may be provided in the form of a button. In addition, the input 21 may include a display that displays an image, and may include a touch portion that receives a touch input.

In addition, a transparent member 22 may be provided on the door 20. The user may observe the inside of a cooking chamber 11 through the transparent member 22 when the door 20 is closed.

Referring to FIGS. 2 and 3, the cooking apparatus 1 may include a cooking chamber 11 provided inside the housing 10 and in which food may be placed. In addition, the cooking apparatus 1 may include an inner housing 12 disposed inside the housing 10 and forming the cooking chamber 11. A predetermined space 15 may be formed between the inner housing 12 and the housing 10.

The housing 10 and the inner housing 12 may be provided to be opened in a first direction A, which is a front direction of the cooking apparatus 1. The user may place the food in the cooking chamber 11 through the opening of the inner housing 12 formed in the first direction A. The cooking chamber 11 may be provided in a rectangular parallelepiped shape having a long side 11L in a second direction B orthogonal to the first direction A in a left-right direction.

The cooking apparatus 1 may include a machine room 13 formed in the housing 10 and disposed below the cooking chamber 11. Various electric parts for operating the cooking apparatus 1 may be disposed inside the machine room 13.

The cooking apparatus 1 may include a shelf 30 mounted inside the cooking chamber 11 and on which food is placed. The shelf 30 may be disposed to be detachable inside the cooking chamber 11. The cooking chamber 11 may include support portions 11*c* formed on both sides of the cooking chamber 11 so that the shelf 30 is mounted between an upper surface 11*a* and a lower surface 11*b* of the cooking chamber 11.

A plurality of support portions 11*c* may be provided in the third direction C so that the shelf 30 is mounted at various heights. The third direction C is a direction perpendicular to the first direction A or the second direction B.

The shelf 30 may include a main body 31 and a cooking surface 32 on which food can be placed. The cooking surface 32 may be provided to face the upper surface 11*a* of the cooking chamber 11 when the shelf 30 is mounted. The cooking surface 32 may have a rectangular shape having a long side in the second direction B and a short side in the first direction A.

The cooking apparatus 1 may include a heat source 100 that provides heat to the inside of the cooking chamber 11 so that the food is cooked by heat. The heat source 100 may provide heat to the food placed on the shelf 30. In addition, the food may be located on the lower surface 11*b* of the cooking chamber 11 without the shelf 30. The heat source 100 may also provide heat to the food located on the lower surface 11*b*.

The heat source 100 may include a first heat source 200 disposed on the upper surface 11*a* of the cooking chamber 11. In addition, the heat source 100 may include a second heat source 300 disposed on the lower surface 11*b* of the cooking chamber 11.

The first heat source 200 may include a plurality of heaters 210, 220, 230, and 240 that generate radiant heat. Heat generated by the plurality of heaters 210, 220, 230, and 240 may be transferred to the food.

The second heat source 300 may include a magnetron 310 generating a high frequency. The high frequency generated by the magnetron 310 repeatedly converts the molecular arrangement of moisture contained in the food, and the food may be heated by frictional heat between the moisture molecules. The magnetron 310 may be disposed in the machine room 13. The magnetron 310 may oscillate a high frequency from the machine room 13 toward the lower surface 11*b* of the cooking chamber 11, and the high frequency may pass through the lower surface 11*b* and be irradiated to the shelf 30.

In the conventional microwave-type cooking apparatus, food is heated using a single magnetron. However, according to the moisture distribution or moisture content of the food, there was a problem that high frequency could not be transmitted evenly to the whole food, and there was a problem that the food could not be cooked efficiently.

To solve this problem, a heater that can transfer heat to the whole food may be installed in the cooking apparatus. By providing food with additional heat, cooking can proceed efficiently.

The cooking apparatus 1 according to the embodiment may include the first heat source 200 and the second heat source 300 to efficiently cook food. As described above, the first heat source 200 is disposed on the upper surface 11*a* of the cooking chamber 11 to transfer heat to the upper portion of the food. However, the first heat source 200 may not efficiently transfer heat to the lower portion of the food.

The cooking apparatus 1 according to the embodiment may provide a heating unit 33 on the shelf 30 so that heat is efficiently transferred to the lower portion of the food. The heating unit 33 may be disposed on the opposite side of the cooking surface 32 in the main body 31 of the shelf 30. The heating unit 33 may be provided to face the lower surface 11*b* of the cooking chamber 11 when the shelf 30 is mounted on the cooking chamber 11.

The heating unit 33 may absorb high frequency generated from the magnetron 310 and generate heat. Heat generated by the heating unit 33 may be transferred to the cooking surface 32 through the main body 31 of the shelf 30. That is, heat generated by the heating unit 33 is conducted to the cooking surface 32, so that heat may be supplied to the lower portion of the food located on the cooking surface 32.

The heating unit 33 may be formed of a ferrite material to absorb high frequency. However, the present disclosure is not limited thereto, and a material capable of generating heat by high frequency may be mixed with ceramic or the like to form the heating unit 33.

Accordingly, even if the user does not turn the food over in the middle of the cooking process, heat can be supplied in the vertical direction of the food, so that cooking can be conducted efficiently.

The cooking apparatus 1 according to the embodiment may include a cooking chamber 11 having a rectangular parallelepiped shape that is formed to be long in the second direction B and relatively short in the first direction A. In other words, the cooking chamber 11 may have a rectangular parallelepiped shape having a long side 11L in the second direction B.

A conventional cooking apparatus having a cooking chamber having a shape similar to that of the cooking chamber 11 of the cooking apparatus 1 according to the embodiment may exist. However, the conventional cooking apparatus generally includes a plurality of heaters having a length in a direction of the long side 11L of the cooking chamber 11, that is, in the second direction B. In other words, in the conventional cooking apparatus, the plurality of heaters each have a long axis extending in the second direction (B), and the plurality of heaters are spaced apart from the inside of the cooking chamber 11 in the first direction A.

In order for the plurality of heaters to generate heat, power is be supplied. In order to supply power to the plurality of heaters, electric wires are be connected to both ends of the plurality of heaters. However, as described above, when the plurality of heaters have a length in the second direction B, a space in which the plurality of heaters and the electric wires are connected may be narrow. Therefore, it may be difficult to connect the electric wires to the plurality of heaters. This will be described later.

On the other hand, there is a case where a plurality of foods having different cooking temperatures are simultaneously placed in the cooking chamber 11 and cooked. In this case, the cooking apparatus 1 may set different temperatures of heat generated from the plurality of heaters 210, 220, 230, and 240. Therefore, it is possible to transfer different heat energy to multiple foods.

When the plurality of heaters 210, 220, 230, and 240 according to the embodiment are disposed on the upper surface 11*a* of the cooking chamber 11, the plurality of food items may be disposed at positions corresponding to the positions of the plurality of heaters 210, 220, 230, and 240. For example, the cooking surface 32 of the shelf 30 may be divided into a plurality of cooking areas, and the plurality of cooking areas may be heated to different temperatures. The plurality of food items may be located in each of the plurality of areas. Thus, different heat energy can be provided to each of the plurality of foods.

The plurality of areas provided at positions corresponding to each of the plurality of heaters 210, 220, 230, and 240 in the third direction C may be formed on the cooking surface 32. Each cooking area may be provided so that different heat generated from each heater is directly transmitted.

Accordingly, even if a plurality of foods having different cooking temperatures are simultaneously placed in the cooking chamber, each food may be cooked according to different cooking temperatures. That is, when each food is placed in a different area, each food can be cooked at a different temperature.

However, in the conventional cooking apparatus, since heaters having the length in the second direction B are spaced apart in the first direction A, the plurality of areas capable of receiving different temperatures are provided in the first direction A. When the plurality of areas are partitioned in the first direction A, which is the direction of a short side 32S of the cooking surface 32, the plurality of areas have a short width. Since the width of each of the plurality of areas formed in the first direction A is short, the temperature difference between the substantially divided areas may be small. In addition, in the same structure as a conventional cooking apparatus, when a bulky food is input, the food may be out of one area of the cooking surface 32 and thus a problem may occur in that the food cannot be cooked at an appropriate temperature.

In addition, since the conventional cooking apparatus divides a plurality of areas in the first direction A, among the plural foods, food that is placed deeply in the rear of the cooking chamber causes discomfort that cannot be easily observed.

In order to solve such a problem, the cooking apparatus 1 according to the embodiment may include the plurality of heaters 210, 220, 230, and 240 having the long axis 200L extending in the first direction A. Each of the heaters 210, 220, 230, and 240 may be spaced apart in the second direction B corresponding to the long side 11L of the cooking chamber 11.

Accordingly, on the cooking surface 32 of the shelf 30, a plurality of areas receiving heat of different temperatures may be divided along the second direction B. Hereinafter, the plurality of heaters 210, 220, 230, and 240 and the plurality of areas partitioned on the shelf 30 will be described in detail.

Figure 4:
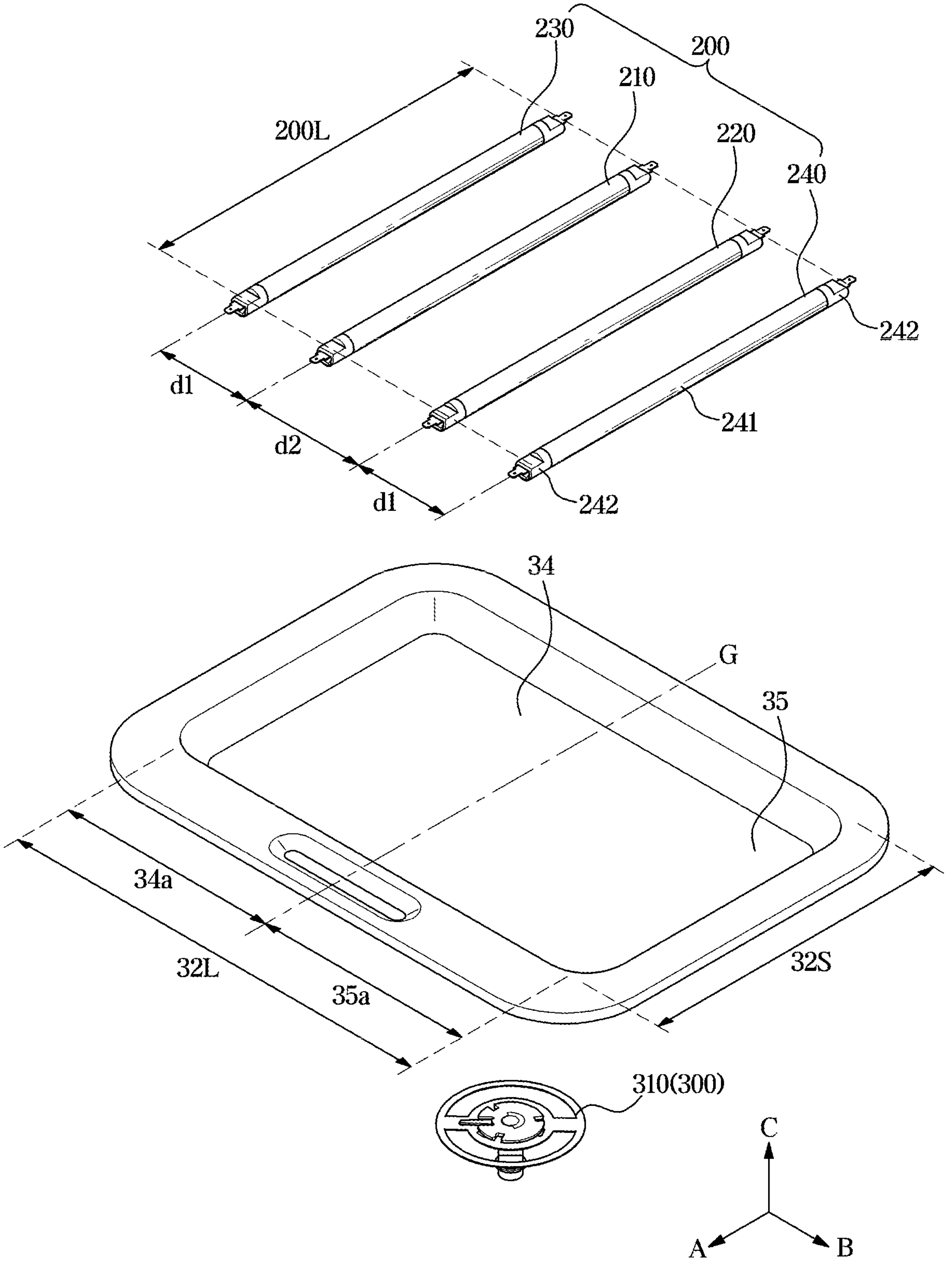
FIG. 4 is a view illustrating a heat source and a shelf of a cooking apparatus according to an embodiment of this disclosure.
Figure 5:
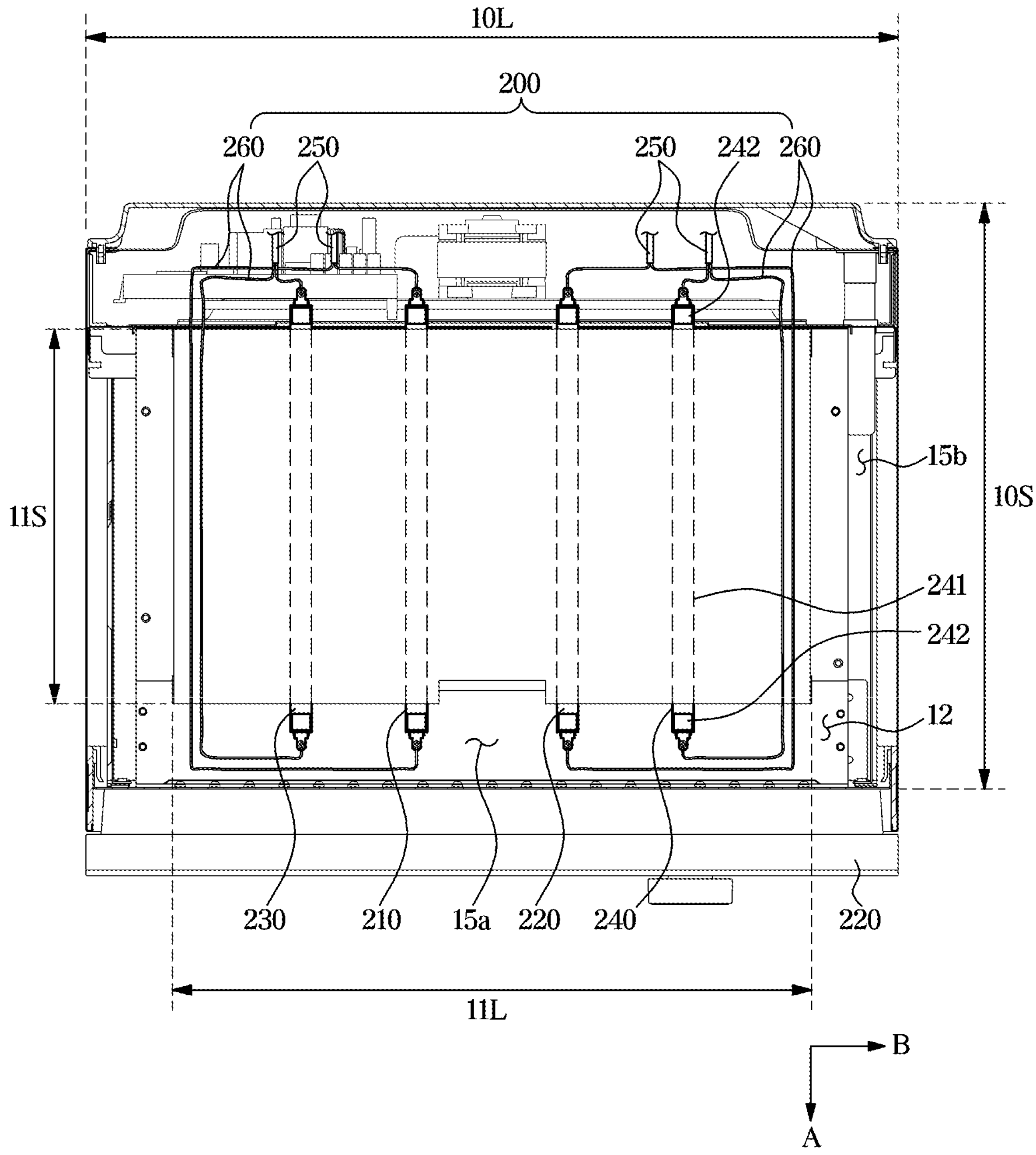
FIG. 5 is a view illustrating a top plan view of a cooking apparatus according to an embodiment of this disclosure.
Figure 6:
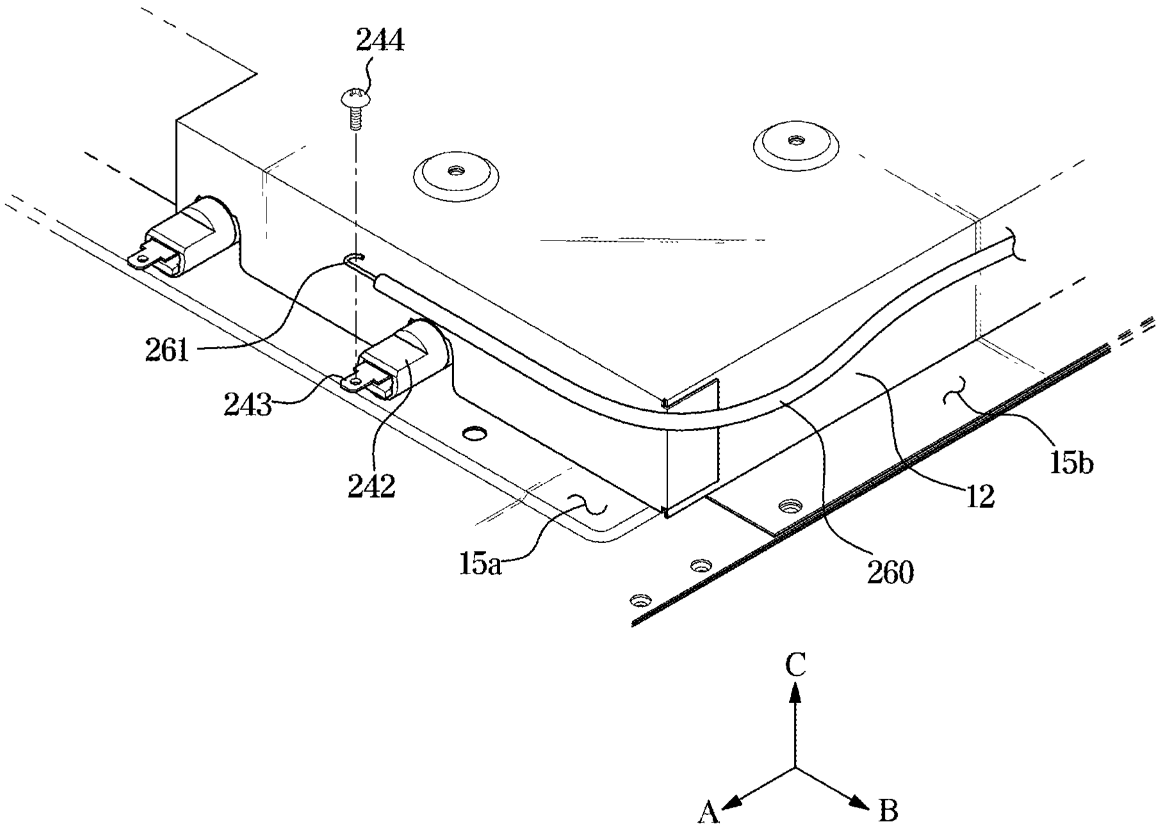
FIG. 6 is a view illustrating that a heater and an electric wire of the cooking apparatus are combined according to an embodiment of this disclosure.

FIG. 4 is a view illustrating a heat source and a shelf of a cooking apparatus according to an embodiment of this disclosure, FIG. 5 is a view illustrating a top plan view of a cooking apparatus according to an embodiment of this disclosure, and FIG. 6 is a view illustrating that a heater and an electric wire of the cooking apparatus are combined according to an embodiment of this disclosure.

Referring to FIGS. 4 and 5, each of the plurality of heaters 210, 220, 230, and 240 has the long axis 200L extending in the first direction A, and the plurality of heaters 210, 220, 230, and 240 may be spaced apart from each other in the second direction B corresponding to the long side 11L of the cooking chamber 11. The separation distance between the plurality of heaters 210, 220, 230, and 240 may be a first separation distance d1 and/or a second separation distance d2.

The first heater 210 and the third heater 230 are arranged to have a first separation distance d1 on the first cooking area 34, and the second heater 220 and the fourth heater 240 may be arranged to have a first separation distance d1 on the second cooking area 35. The first heater 210 and the second heater 220 may be disposed to have a second separation distance d2. The second separation distance d2 may be formed longer than the first separation distance d1. This is to provide a temperature difference between the first cooking area 34 and the second cooking area 35.

The plurality of heaters 210, 220, 230, and 240 may include the first heater 210, the second heater 220, the third heater 230, and the fourth heater 240. However, the disclosure is not limited thereto, and the plurality of heaters 210, 220, 230, and 240 may include the first heater 210 and the second heater 220, or may include four or more heaters.

The plurality of heaters 210, 220, 230, and 240 all have the same shape, and the description will be made with reference to the fourth heater 240 hereinafter. The fourth heater 240 may include a body portion 241 that extends in a direction of the long axis 200L and generates heat by power, and both ends 242 disposed at both ends of the body portion 241.

Both ends 242 may be provided so that external power is supplied to the fourth heater 240. The body portion 241 may be heated by power supplied from both ends 242, and heat may be transferred to the shelf 30. Both ends 242 may be disposed along the first direction A.

The first heater 210 is disposed on one side of the cooking apparatus 1 in the second direction B, and the second heater 220 is on the opposite side of the first heater 210 in the second direction B. Particularly, the first heater 210 may be disposed on one side and the second heater 220 may be disposed on the opposite side based on the center line G of the cooking surface 32. The third heater 230 may be disposed adjacent to the first heater 210, and the fourth heater 240 may be disposed adjacent to the second heater 220.

Meanwhile, the first heater 210 and the third heater 230 may generate heat of the same temperature. In addition, the second heater 220 and the fourth heater 240 may generate heat of the same temperature. The first and third heaters 210 and 230 and the second and fourth heaters 220 and 240 may generate heat of different temperatures. That is, based on the center line G, the heating temperature of one side and the heating temperature of the opposite side may be different from each other.

For example, the cooking apparatus 1 may set the heating temperature of the first heater 210 to be higher than the heating temperature of the second heater 220. In this case, the first heater 210 and the second heater 220 may be independently controlled based on the set temperature.

Meanwhile, the heating temperature of each of the plurality of heaters 200 (210, 220, 230, 240) is set to be the same, but the driving method of each heater may be controlled differently. For example, during the cooking time, the cooking apparatus 1 continuously drives the first and third heaters 210 and 230, and turns on/off repeatedly the second and fourth heaters 220 and 240. Accordingly, the thermal energy provided by the first and third heaters 210 and 230 may be greater than the thermal energy provided by the second and fourth heaters 220 and 240.

In FIG. 4, the shelf 30 may include the first cooking area 34 and a second cooking area 35 formed on the cooking surface 32. The first cooking area 34 may be formed on one side of the center line G, and the second cooking area 35 may be formed on the opposite side.

The first cooking area 34 may be disposed at a position corresponding to the first and third heaters 210 and 230 in the third direction C. The second cooking area 35 may be disposed at a position corresponding to the second and fourth heaters 220 and 240 in the third direction C.

As described above, when the heat generated by the first and third heaters 210 and 230 and the second and fourth heaters 220 and 240 is different, thermal energy transferred to the first cooking area 34 and the second cooking area 35 may also be different. That is, the heat generated by the first heater 210 and the third heater 230 may be transferred from the upper surface 11*a* to the first cooking area 34. The heat generated by the second heater 220 and the fourth heater 240 may be transferred from the upper surface 11*a* to the second cooking area 35.

In addition, heat conducted from the heating unit 33 may be transferred to the first cooking area 34 and the second cooking area 35. The heating unit 33 is heated by high frequency oscillations from the magnetron 310 disposed on the lower surface 11*b*, and heat generated accordingly may be equally conducted to the first cooking area 34 and the second cooking area 35 through the main body 31.

Since the heat generated by the first and third heaters 210 and 230 and the second and fourth heaters 220 and 240 is different, respectively, and the heat transferred to the first cooking area 34 and the second cooking area 35 may be different, foods having different cooking temperatures are disposed in the first cooking area 34 and the second cooking area 35, respectively, so that they can be cooked simultaneously.

In addition, different foods may be located in the left and right directions based on the first direction A, which is the front of the cooking apparatus 1, the user can easily observe the cooking state of foods through the transparent member 22.

As illustrated in FIG. 4, the short side 32S of the cooking surface 32 is orthogonal to the long side 32L, and may extend in the first direction A. In response to the plurality of heaters 210, 220, 230, and 240 being spaced apart in the second direction B, the first cooking area 34 and the second cooking area 35 can be divided in the second direction B. Since the long side 32L of the cooking surface 32 extends in the second direction B, the first cooking area 34 and the second cooking area 35 may have a sufficient length in one direction.

That is, the length of the first cooking area 34 along the second direction B may be defined as the first length 34*a*, and the length of the second cooking area 35 may be defined as the second length 35*a*. The first length 34*a* and the second length 35*a* may be provided to secure an area sufficient for food to be located in the first cooking area 34 or the second cooking area 35. Accordingly, areas of the first cooking area 34 and the second cooking area 35 may be provided as 34*a**32S and 35*a**32S, respectively.

Meanwhile, the first length 34*a* or the second length 35*a* may be provided with the same length as the short side 32S of the cooking surface 32. In this case, the first cooking area 34 and the second cooking area 35 may be provided in a square shape, and food may be easily located within the first cooking area 34 or the second cooking area 35.

In addition, the first length 34*a* or the second length 35*a* may be provided with a length different from the short side 32S of the cooking surface 32. In this case, the first cooking area 34 and the second cooking area 35 may have a rectangular shape. However, even when the first cooking area 34 and the second cooking area 35 are provided in a rectangular shape, the ratio between the horizontal length and the vertical length of each of the first cooking area 34 and the second cooking area 35 is provided within a predetermined ratio range. Accordingly, the first cooking area 34 and the second cooking area 35 may provide larger accommodation space than the conventional cooking apparatus described above in receiving food.

Referring to FIG. 5, the housing 10 may have a long side 10L in a second direction B and a short side 10S in the first direction A corresponding to the area of the cooking chamber 11. The plurality of heaters 210, 220, 230, and 240 may have the long axis 200L extending in the first direction A and may be spaced apart in the second direction B.

Accordingly, the body portion 241 of the heater 240 may be disposed inside the inner housing 12 and provided to be positioned inside the cooking chamber 11. Both ends 242 of the heater 240 may pass through the inner housing 12 and may be provided to be disposed in the space 15 formed outside the cooking chamber 11.

The first heat source 200 may include a power supply 250 for supplying power to the heater 240 and an electric wire 260 coupled with both ends 242 to electrically connect the heater 240. The electric wire 260 may be provided to be coupled to both ends 242 in the space 15 formed between the inner housing 12 and the housing 10.

The both ends 242 of the heater 240 may be disposed toward the first direction A. Accordingly, the electric wire 260 and both ends 242 may be coupled within a first separation space 15*a* formed between the long side 10L of the housing 10 and the long side 11L of the cooking chamber 11.

In the case of the conventional cooking apparatus, the both ends 242 of the heater 240 may be arranged toward the second direction B, and in the second separation space 15*b* formed between the short side 10S of the housing 10 and the short side 11S of the cooking chamber 11, the both ends 242 and the electric wire 260 may be combined.

In the case of the cooking apparatus 1 according to the embodiment, the both ends 242 and the electric wire 260 are combined in a narrow space such as the first separation space 15*a*, and when the electric wire 260 is inserted into the both ends 242 in the first direction A or the second direction B, the electric wire 260 may be excessively bent, and stable coupling may be difficult.

To solve this, as illustrated in FIG. 6, the both ends 242 of the heater 240 may be provided to be coupled to the electric wire 260 in the third direction C. Therefore, even if the first separation space 15*a* is narrow, the electric wire 260 and the heater 240 may be stably coupled. That is, as the electric wire 260 and both ends 242 are coupled in the third direction C, stress in the first direction A or the second direction B due to bending of the electric wire 260 is minimized, and the electric wire 260 and the both ends 242 may be stably coupled.

The electric wire 260 may include a contact portion 261 that is in contact with the both ends 242 to supply power. The both ends 242 may include a flange 243 provided to contact the contact portion 261 in the third direction C. The both ends 242 may include a coupling member 244 provided so that the contact portion 261 is coupled to the flange 243 in a state in which the flange 243 and the contact portion 261 are in contact. The coupling member 244 may be provided with screws or the like. The coupling member 244 is coupled with the flange 243 in the third direction C while the contact portion 261 is in contact with the flange 243 in the third direction C, and then the contact state of the flange 243 and the contact portion 261 may be fixed.

In this way, as the direction in which the heater 240 and the electric wire 260 are assembled is formed to correspond to the third direction C, even if the first separation space 15*a*, which is a space in which the heater 240 and the electric wire 260 are assembled, is provided narrowly in the first direction A or the second direction B, the heater 240 and the electric wire 260 may be easily assembled.

Figure 7:
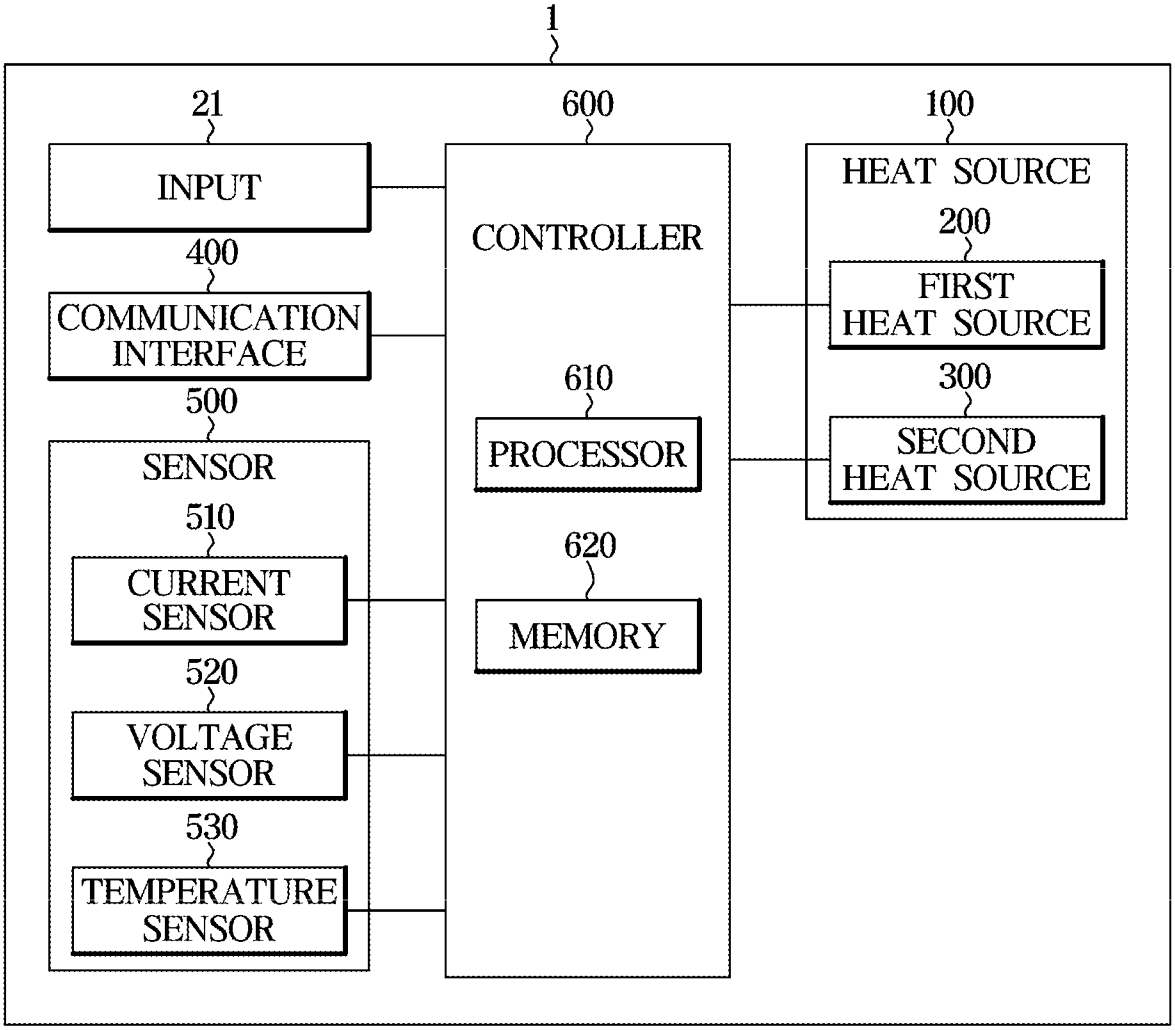
FIG. 7 is a control block diagram illustrating a cooking apparatus according to an embodiment of this disclosure.

FIG. 7 is a control block diagram illustrating a cooking apparatus according to an embodiment of this disclosure.

Referring to FIG. 7, the cooking apparatus 1 may include the input 21, the heat source 100, a communication interface 400, a sensor 500, and a controller 600. The controller 600 is electrically connected to the input 21, the heat source 100, the communication interface 400, and the sensor 500.

The controller 600 may include a processor 610 and a memory 620. The processor 610 is hardware and may include a logic circuit and an operation circuit. The processor 610 may control components of the cooking apparatus 1 electrically connected by using programs, instructions, and/or data stored in the memory 620 to operate the cooking apparatus 1. The controller 600 may be implemented as a control circuit including a capacitor, a coil, and a resistance element. The processor 610 and the memory 620 may be implemented as separate chips, or may be implemented as a single chip. In addition, the controller 600 may include a plurality of processors and a plurality of memories.

The memory 620 may store programs and/or data for the operation of the cooking apparatus 1 and may store temporary data generated by the processor 610. The memory 620 includes a nonvolatile memory such as a ROM (Read Only Memory) and a flash memory for storing data for a long period of time, and a volatile memory such as static random access memory (S-RAM), D—May include a volatile memory for storing data temporarily.

The input 21 may include a button for receiving a user's input and a display for displaying an operating state of the cooking apparatus 1. The input 21 may receive a command related to the operation of the cooking apparatus 1 from a user. For example, the input 21 may receive one or more of a command for selecting a cooking mode, a command for selecting a recipe, a command for adjusting the output of the heat source, or a command for adjusting the cooking time from the user. Meanwhile, the cooking mode may include an automatic cooking mode, and the automatic cooking mode may refer to a mode in which cooking is automatically performed according to recipe data obtained from a server or the memory 620. The processor 610 may process a command input through the input 21 and control the operation of the cooking apparatus 1 corresponding to the command.

The heat source 100 may include the first heat source 200 and the second heat source 300, and the first heat source 200 may be composed of the plurality of heaters 210, 220, 230, and 240. The second heat source 300 may be formed of the magnetron 310. Since the heat source 100 is the same as described above, a redundant description will be omitted.

The communication interface 400 may transmit and receive data with the server. Particularly, the communication interface 400 may receive recipe data from the server under the control of the controller 600. The communication interface 400 may connect the cooking apparatus 1 to an external device or the server through a network or a communication channel. The communication interface 400 may include various communication modules. For example, the communication interface 400 may include carious communication module connectable to various communication networks such as Bluetooth, Zigbee, wireless local area network (wireless local area network), home radio frequency (RF), ultra-wide band (UWB), and the Internet.

The sensor 500 may include one or more of a current sensor 510, a voltage sensor 520, and a temperature sensor 530. The current sensor 510 may measure a current applied to the heat source 100. The current sensor 510 may measure the current applied to the power supply 250 and transmit the measured current value to the processor 610. The voltage sensor 520 may measure a voltage applied to the heat source 100. The voltage sensor 520 may check and/or measure the voltage applied to the power supply 250 and transmit the measured voltage value to the processor 610. In FIG. 7, the current sensor 510 and the voltage sensor 520 are shown separately, but the current sensor 510 and the voltage sensor 520 may be implemented as a single device. The temperature sensor 530 may identify and/or measure the temperature inside the cooking chamber 11 and transmit the measured temperature value to the processor 610.

Hereinafter, a method of operating the cooking apparatus 1 by the controller 600 will be described in detail.

First, the memory 620 may store second output information of the cooking apparatus 1. In addition, the memory 620 may store recipe data including first output information of a reference cooking apparatus. The reference cooking apparatus may refer to a device used when generating recipe data. The recipe data and the second output information of the cooking apparatus 1 may be stored in the memory 620 when the cooking apparatus 1 is produced. In addition, recipe data downloaded through the communication interface 400 may be additionally stored in the memory 620.

Meanwhile, the first output information of the reference cooking apparatus included in the recipe data may include a first output value of the reference cooking apparatus, a first cooking time, and first operation setting information of the heat source. For example, the first operation setting information of the heat source may include a first on-off time of the heat source. The first output value may refer to power consumption (first power consumption) of the reference cooking apparatus used when generating recipe data. Further, the first cooking time may refer to a time required for the entire cooking process performed according to recipe data.

The second output information of the cooking apparatus 1 may include a second output value of the cooking apparatus 1 and a maximum output value and a minimum output value of each of the plurality of heaters 210, 220, 230, 240 and the magnetron 310. The second output value may refer to power consumption (second power consumption) of the cooking apparatus 1 or an output value that the cooking apparatus 1 can actually provide.

Meanwhile, as in the above-described automatic cooking mode, when cooking is automatically performed according to the recipe data obtained from the server or the memory 620, the output of the device used when generating the recipe data may be different from the output of the cooking apparatus 1 that actually performs cooking.

For example, the first output value of the reference cooking apparatus used when generating the recipe data may be 700 W, and the second output value of the cooking apparatus 1 may be 1000 W. When the cooking apparatus 1 operates the heat source 100 during the first cooking time included in the recipe data with the output of 1000 W, over-cook may occur. This is because the heat energy actually transferred to the food by the cooking apparatus 1 is greater than the heat energy applied to the food by the recipe data.

Conversely, the first output value of the recipe data may be 1000 W, and the second output value of the cooking apparatus 1 may be 700 W. When the cooking apparatus 1 operates the heat source 100 during the first cooking time with the output of 700 W, under-cook may occur. This is because the heat energy transferred to the food by the cooking apparatus 1 is smaller than the heat energy applied to the food by the recipe data.

Meanwhile, the second output value of the cooking apparatus 1 may vary due to changes in current and/or voltage applied to the power supply 250. Since power specifications may be different for each home of users, the output value actually provided by the cooking apparatus 1 may be different from a predetermined power consumption.

As described above, when there is a difference between the first output information of the recipe data and the second output information of the cooking apparatus 1 in the automatic cooking mode, it is difficult for the user to recognize the difference. Even if the user recognizes the difference, it is difficult to appropriately change the operation setting of the cooking apparatus 1 according to the recipe data. In addition, there is a limitation in preparing different recipe data for each cooking apparatus having various specifications.

Therefore, in order to prevent cooking failure (overcook or undercook) caused by applying the recipe data as it is, a technology for comparing the first output information of the recipe data and the second output information of the cooking apparatus 1, and automatically controlling the heat source 100 so that the heat source 100 of the cooking apparatus 1 operates properly according to the comparison result is required.

The processor 610 may obtain the first output information from the recipe data obtained from the server or the recipe data stored in the memory 620. Also, the processor 610 may obtain the second output information from the memory 620. The processor 610 may compare the first output information of the recipe data and the second output information of the cooking apparatus 1 and obtain a difference between the first output information and the second output information.

Particularly, the processor 610 may identify the first output value of the device used when generating the recipe data from the first output information, and may calculate the difference between the first output value and the second output value of the cooking apparatus 1 included in the second output information. For example, the first output value may be 700 W, the first cooking time may be 10 minutes, and the second output value may be 1000 W. Therefore, the difference between the first output value and the second output value may be 300 W. When the cooking apparatus 1 operates the heat source 100 for 10 minutes, which is the first cooking time of the recipe data with the output of 1000 W, unlike the recipe data, 50 Wh (=300 W*(10/60) min) of the heat energy may be further transferred to the food, and over-cooking may occur. Therefore, it is useful to correct the difference between the first output information of the recipe data and the second output information of the cooking apparatus 1.

The processor 610 may change the operation setting of the heat source 100 included in the recipe data based on the difference between the first output information and the second output information. Particularly, the processor 610, based on the difference value between the first output value and the second output value, may change the on-off time of the heat source 100, change the operation output of the heat source 100, or determine a second cooking time different from the first cooking time. That is, the cooking apparatus 1 may change setting information of the heat source 100 of the cooking apparatus 1 so that the heat energy provided to the food by the heat energy (output amount) provided to the food when the recipe data is generated. In this way, the over-cook or the under-cook may be prevented.

In other words, when the first output value of the recipe data is smaller than the second output value of the cooking apparatus 1, the processor 610 may change the on-off time of the heat source 100 within the first cooking time of the recipe data. That is, the processor 610 may make the entire cooking time the same as the recipe data and adjust the on-off time of the heat source 100 without changing the operation output of the heat source 100. Therefore, the heat energy provided to the food may be the same as the recipe data.

Further, the processor 610 may determine the operation output of the heat source 100 as the first output value when the first output value of the recipe data is smaller than the second output value of the cooking apparatus 1. The processor 610 may lower the operation output of the heat source 100 itself to be the same as the output of the recipe data. Since the operation output of the heat source 100 is the same as the output of the recipe data, the cooking time may be set equal to the first cooking time of the recipe data. Therefore, the heat energy provided to the food may be the same as the recipe data.

In addition, when the first output value of the recipe data is greater than the second output value of the cooking apparatus 1, the processor 610 may determine the second cooking time of the cooking apparatus 1 to be longer than the first cooking time of the recipe data. In other words, when the maximum output of the cooking apparatus 1 is smaller than the output of the recipe data, by increasing the cooking time of the cooking apparatus 1, the heat energy provided to the food may be matched with the recipe data.

Meanwhile, when the first output value of the recipe data is the same as the second output value of the cooking apparatus 1, the processor 610 may control the heat source 100 based on the first output information of the recipe data. In other words, when the power consumption of the device used to create the recipe data and the power consumption of the cooking apparatus 1 are the same, the cooking apparatus 1 may operates the heat source 100 by applying the recipe data as it is and perform cooking.

The processor 610 may obtain the second output value of the cooking apparatus 1 based on the current or voltage identified by the sensor 500. As described above, since power specifications may be different for each home of users, the output value actually provided by the cooking apparatus 1 may be different from the predetermined power consumption. Therefore, the cooking apparatus 1 may measure the current and/or the voltage applied to the power supply 250 to calculate the output value that can be actually provided, and may compare the calculated output value with the first output value of the recipe data.

In addition, the processor 610 may selectively change the operation setting of each of the plurality of heaters 210, 220, 230, and 240 disposed above the cooking chamber 11. In addition, the processor 610 may selectively change the operation settings of the magnetron 310 and the plurality of heaters 210, 220, 230, and 240 that are disposed under the cooking chamber 11 to provide the high frequency.

As described above, the plurality of heaters 210, 220, 230, and 240 and the magnetron 310 may be independently controlled, and the operation of the heaters 210, 220, 230, and 240 may be set differently depending on the position where the food is placed in the cooking chamber 11. For example, the first and third heaters 210 and 230 may be controlled to be continuously driven according to the recipe data. The second and fourth heaters 220 and 240 may be controlled to repeat on and off according to the changed on-off time within the first cooking time of the recipe data. The magnetron 310 may be controlled to be driven for the second cooking time longer than the first cooking time of the recipe data. In this way, when the cooking apparatus 1 includes the plurality of heat sources 200 and 300, cooking corresponding to the recipe data may be performed by appropriately changing the operation settings of each of the plurality of heat sources 200 and 300.

Figure 8:
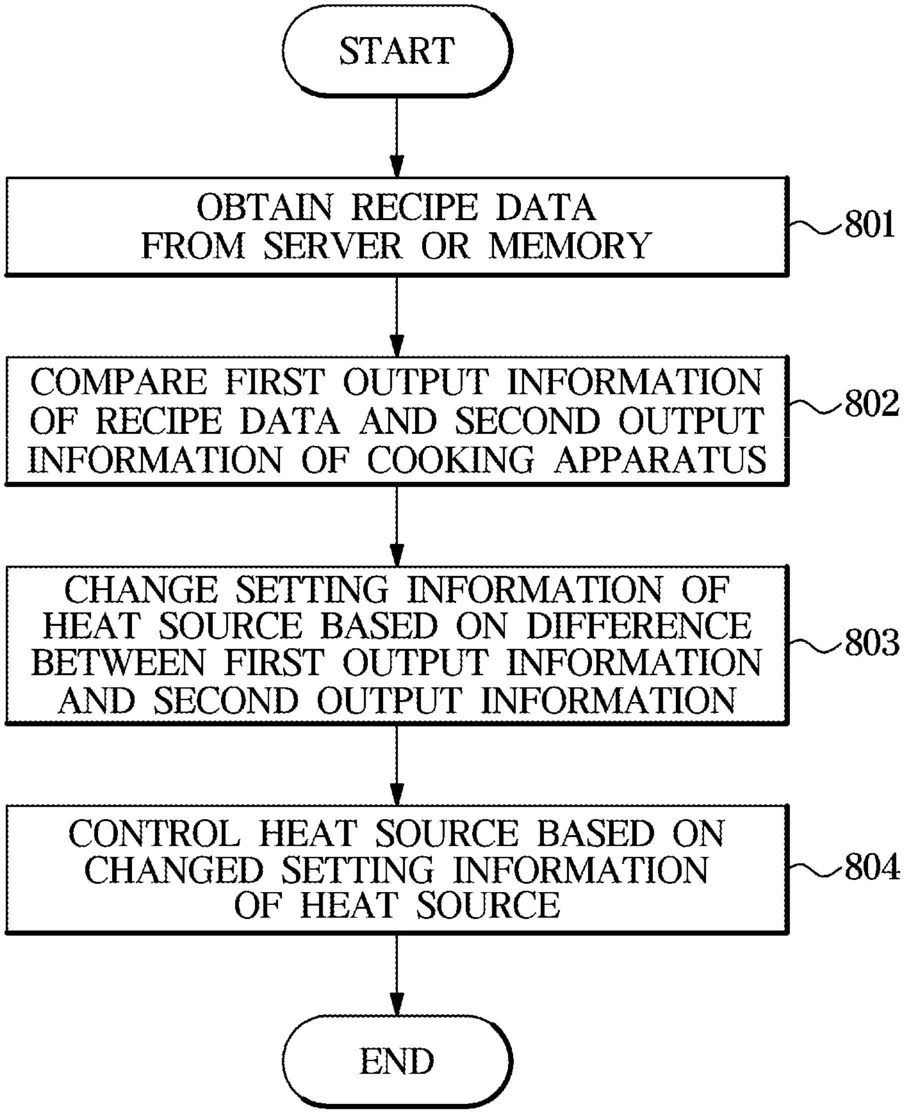
FIG. 8 is a flowchart illustrating a method of controlling a cooking apparatus according to an embodiment of this disclosure.

FIG. 8 is a flowchart illustrating a method of controlling a cooking apparatus according to an embodiment of this disclosure.

Referring to FIG. 8, the processor 610 of the cooking apparatus 1 may obtain the first output information from the recipe data obtained from the server or the recipe data stored in the memory 620 (801). Also, the processor 610 may obtain the second output information from the memory 620.

The processor 610 may compare the first output information of the recipe data and the second output information of the cooking apparatus 1 (802), and may change the operation setting of the heat source 100 based on the difference between the first output information and the second output information (803). Particularly, the processor 610, based on the difference value between the first output value and the second output value, may change the on-off time of the heat source 100, change the operation output of the heat source 100, or determine the second cooking time different from the first cooking time of the recipe data. The processor 610 may control the heat source 100 based on the changed setting information of the heat source 100 (804).

That is, the cooking apparatus 1 may change the setting information of the heat source 100 so that the heat energy (output amount) provided to the food from the recipe data and the heat energy provided to the food by the heat source 100 of the cooking apparatus 1 are the same. Through this, it is possible to prevent cooking failure (over-cook or under-cook).

Figure 9:
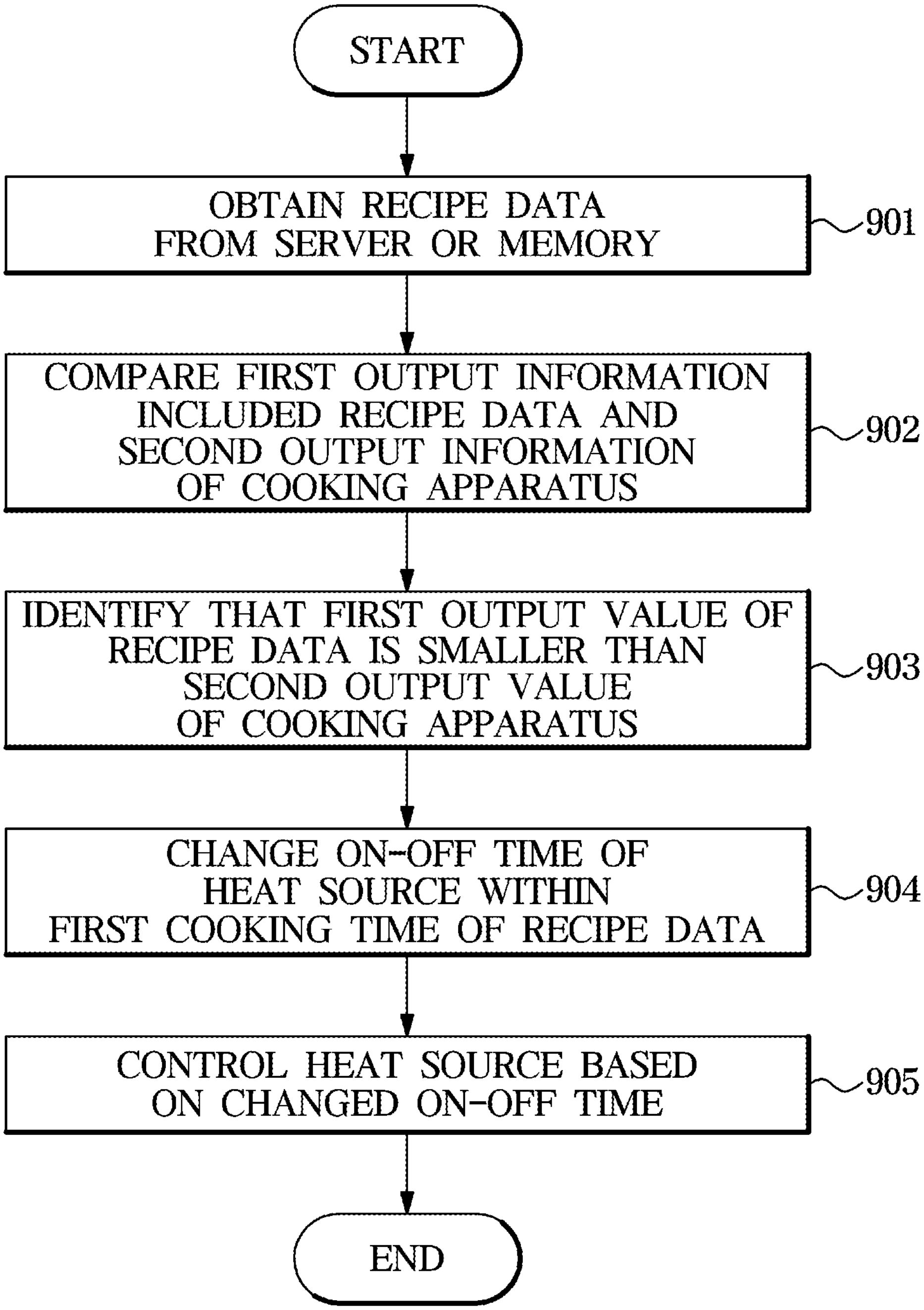
FIG. 9 is a flowchart illustrating a method for controlling a cooking apparatus by changing an on/off time of a heat source according to an embodiment of this disclosure.
Figure 10:
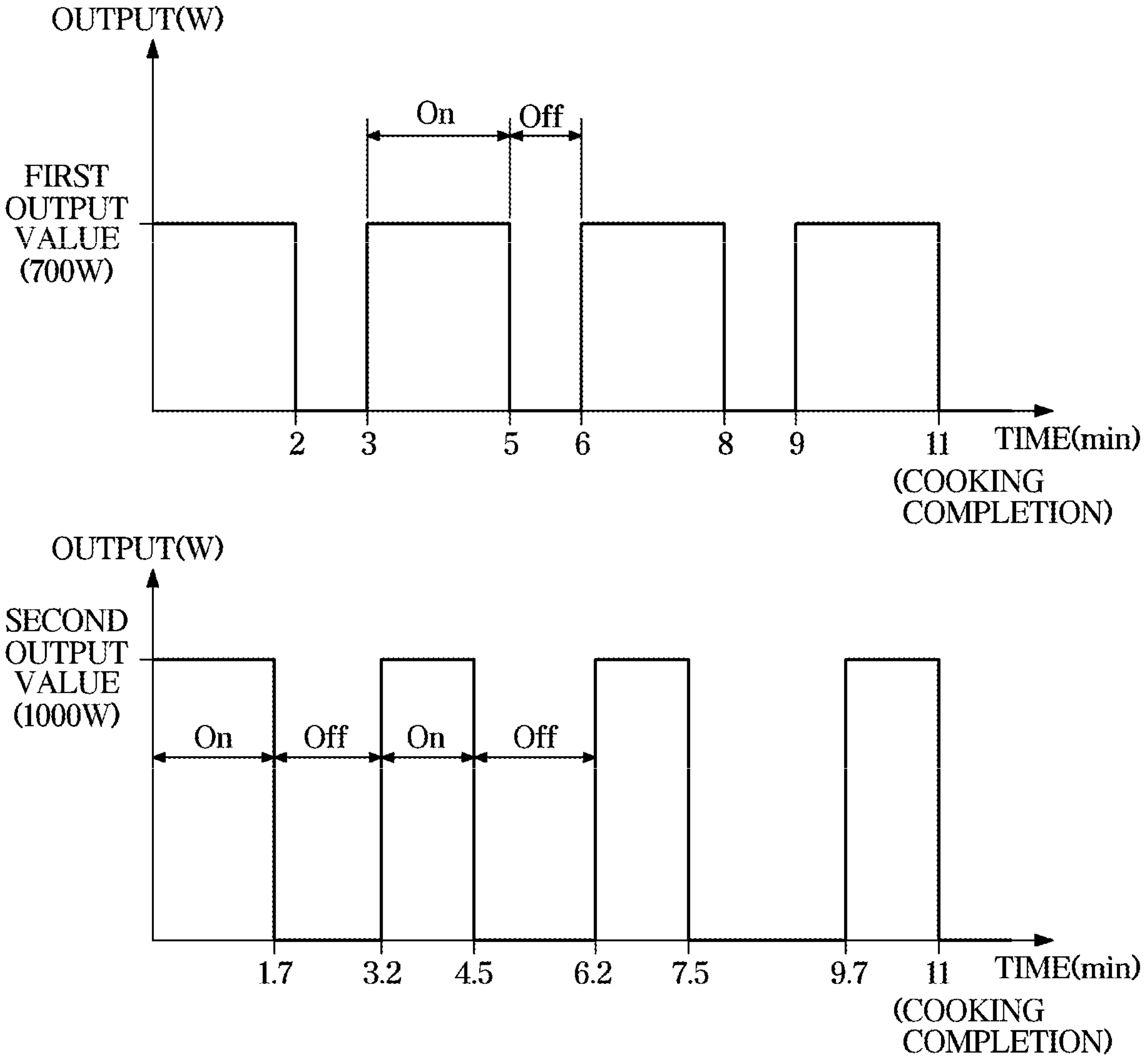
FIG. 10 is a graph for describing FIG. 9 according to an embodiment of this disclosure.

FIG. 9 is a flowchart illustrated a method for controlling a cooking apparatus by changing an on/off time of a heat source according an embodiment of this disclosure, and FIG. 10 is a graph for describing FIG. 9 according to an embodiment of this disclosure.

Referring to FIG. 9, the processor 610 may obtain the first output information from the recipe data obtained from the server or the recipe data stored in the memory 620 (901), compare the first output information of the recipe data with the second output of the cooking apparatus 1 (902), and identify that the first output value of the recipe data is smaller than the second output value of the cooking apparatus 1 (903).

When the first output value of the recipe data is smaller than the second output value of the cooking apparatus 1, the processor 610 may change the on-off time of the heat source 100 within the first cooking time of the recipe data (904).

The processor 610 may control the heat source 100 based on the changed on-off time of the heat source 100 (905).

Referring to FIG. 10, the first output value identified from the first output information of the recipe data may be 700 W, the first cooking time may be 11 minutes, and the first on-off time may be 2 minutes on and 1 minute off.

In addition, the second output value identified from the second output information of the cooking apparatus 1 may be 1000 W. Therefore, the difference between the first output value and the second output value may be 300 W. When the heat source 100 of the cooking apparatus 1 outputs 1000W for 11 minutes at intervals of 2 minutes, the cooking apparatus 1 may provide excessive heat energy to the food, and the cooking failure may occur.

Accordingly, the processor 610 may correct the difference between the first output value and the second output value by changing the on-off time of the heat source 100 within the first cooking time of the recipe data. FIG. 10 illustrates that the on time of the heat source 100 is adjusted to a total of 5.6 minutes.

Meanwhile, the on-off time of the heat source 100 may be set differently for each section. As illustrated in FIG. 10, at an initial stage of the operation of the heat source 100, the on-off time of the heat source 100 may be set to 1.7 minutes on and 1.5 minutes off. This may be for rapidly increasing the temperature in the cooking chamber 11. Thereafter, the heat source 100 may operate at 1.3 minutes on and 1.5 minutes off.

In addition, the processor 610 may adjust the on-off time of the heat source 100 differently for each section based on the temperature value inside the cooking chamber 11. When a target temperature is set, the processor 610 may adjust the on-off time of the heat source 100 differently for each section in order to maintain the temperature inside the cooking chamber 11 at the target temperature. In other words, the processor 610 may feedback control the heat source 100 based on the temperature inside the cooking chamber 11.

By adjusting the on-off time of the heat source 100 as described above, the heat energy provided to the food may be equal to the recipe data, and the cooking failure may be prevented.

Figure 11:
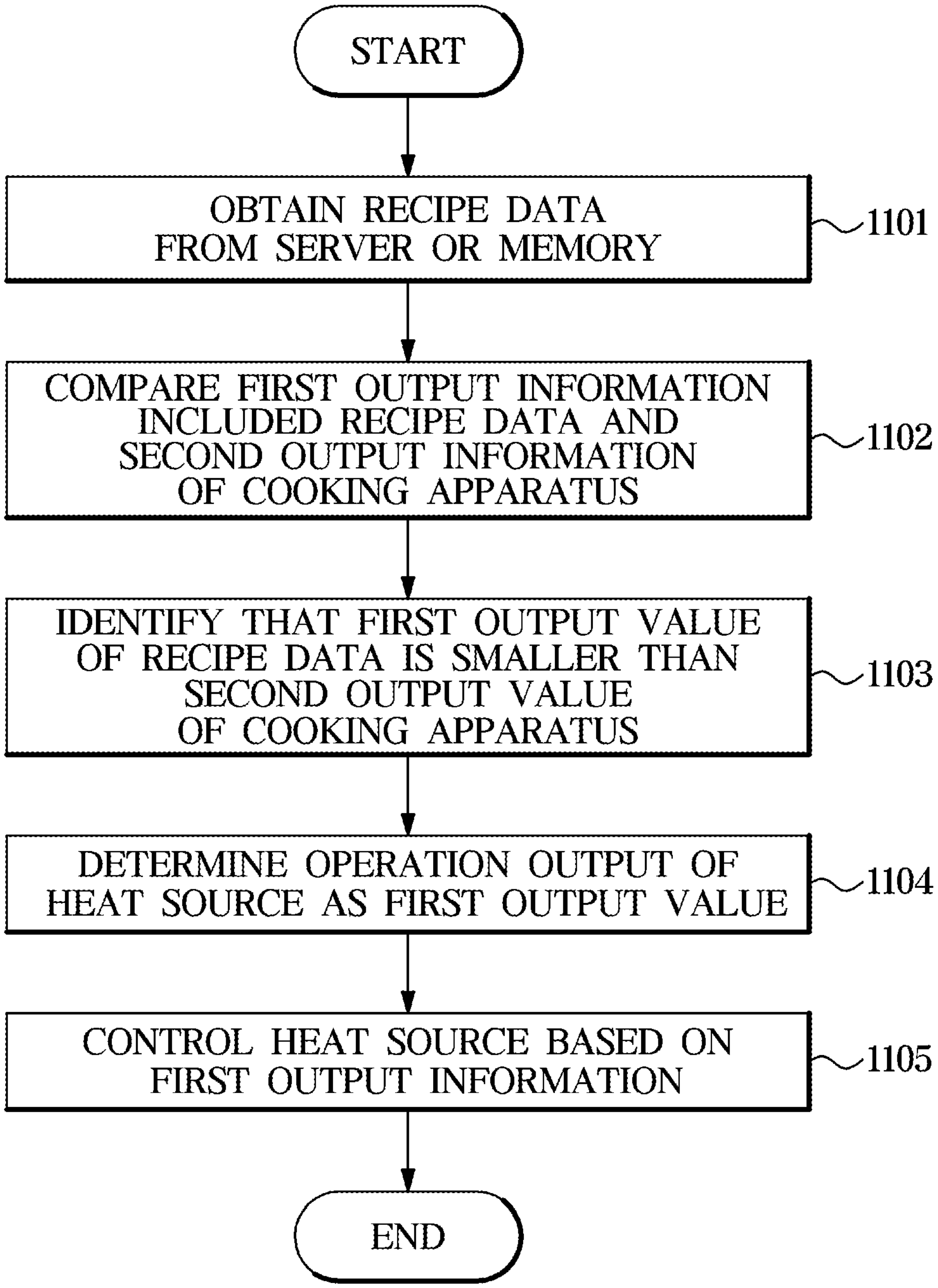
FIG. 11 is a flowchart illustrating a method for controlling a cooking apparatus by changing an operation output of a heat source according to an embodiment of this disclosure.

FIG. 11 is a flowchart illustrating a method for controlling a cooking apparatus by changing an operation output of a heat source according to an embodiment of this disclosure.

Referring to FIG. 11, the processor 610 may obtain the first output information from the recipe data obtained from the server or the recipe data stored in the memory 620 (1101), compare the first output information of the recipe data with the second output of the cooking apparatus 1 (1102), and identify that the first output value of the recipe data is smaller than the second output value of the cooking apparatus 1 (1103).

When the first output value of the recipe data is smaller than the second output value of the cooking apparatus 1, the processor 610 may determine the operation output of the heat source 100 as the first output value (1104). The processor 610 may control the heat source 100 based on the first output information of the recipe data (1105).

In other words, the processor 610 may lower the operation output of the heat source 100 itself to be the same as the output of the recipe data. Since the operation output of the heat source 100 is the same as the output of the recipe data, the cooking time may be set equal to the first cooking time of the recipe data. Therefore, the heat energy provided to the food may be the same as the recipe data.

Figure 12:
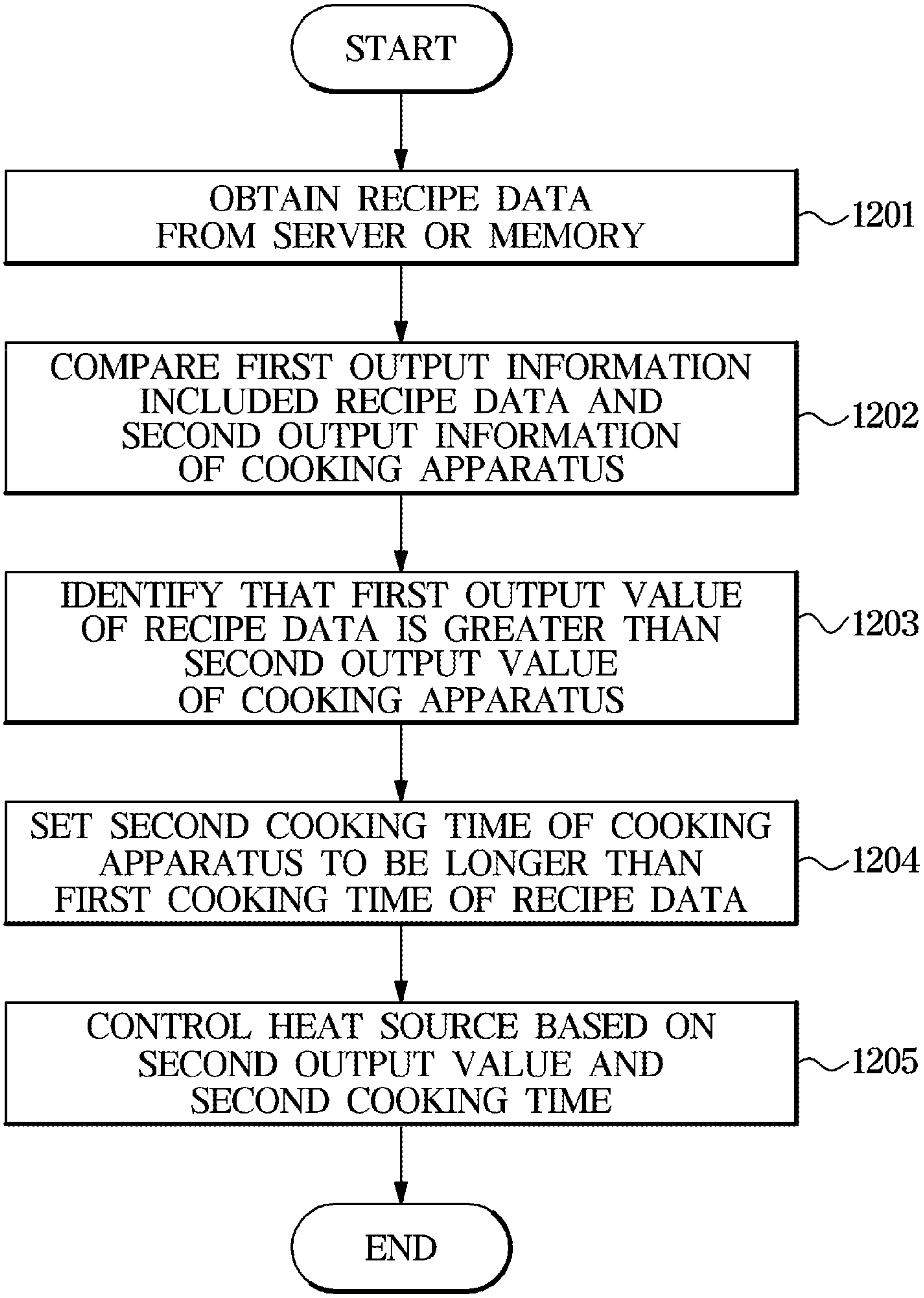
FIG. 12 is a flowchart illustrating a method for controlling a cooking apparatus by changing a cooking time according to an embodiment of this disclosure.
Figure 13:
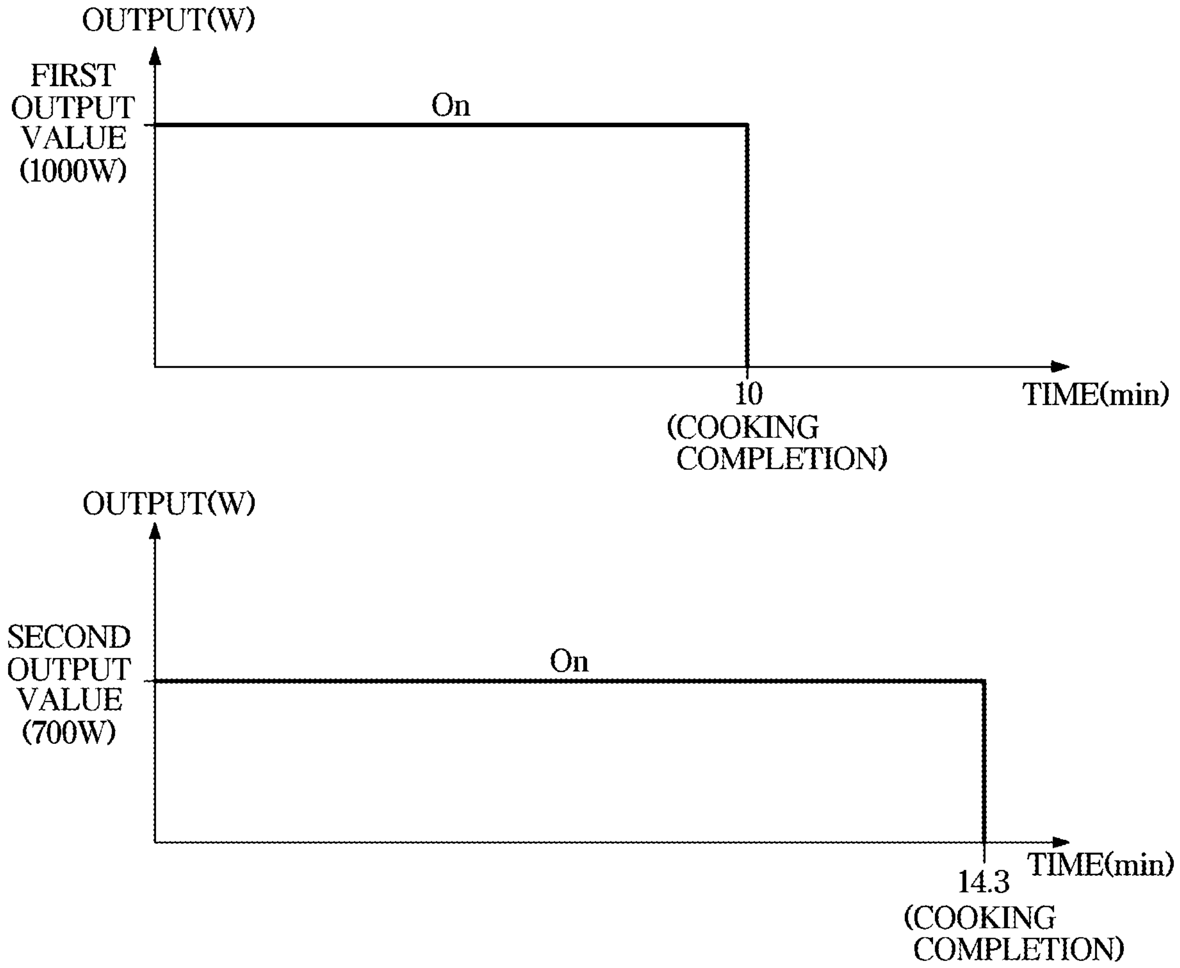
FIG. 13 is a graph for describing FIG. 12 according to an embodiment of this disclosure.

FIG. 12 is a flowchart illustrating a method for controlling a cooking apparatus by changing a cooking time according to an embodiment of this disclosure, and FIG. 13 is a graph for describing FIG. 12 according to an embodiment of this disclosure.

Referring to FIG. 12, the processor 610 may obtain the first output information from the recipe data obtained from the server or the recipe data stored in the memory 620 (1201), compare the first output information of the recipe data with the second output of the cooking apparatus 1 (1202), and identify that the first output value of the recipe data is smaller than the second output value of the cooking apparatus 1 (1203).

When the first output value of the recipe data is greater than the second output value of the cooking apparatus 1, the processor 610 may determine the second cooking time of the cooking apparatus 1 to be longer than the first cooking time of the recipe data (1204). In other words, when the maximum output of the cooking apparatus 1 is smaller than the output of the recipe data, the cooking time of the cooking apparatus 1 may be increased to match the heat energy provided to the food equally to the recipe data. The processor 610 may control the heat source 100 based on the second output value and the second cooking time (1205).

Referring to FIG. 13, the first output value identified from the first output information of the recipe data is 1000 W, the first cooking time is 10 minutes, and the heat source may be continuously driven during the first cooking time. In addition, the second output value identified from the second output information of the cooking apparatus 1 may be 700 W. When the cooking apparatus 1 operates the heat source 100 during the first cooking time with the second output value of 700 W, the under-cook may occur. This is because the heat energy (116.67 Wh) transferred to the food by the cooking apparatus 1 is less than the heat energy (166.67 Wh) of the recipe data. Accordingly, the processor 610 may increase the cooking time and match the heat energy provided to the food to the same as the recipe data. FIG. 13 illustrates that the second cooking time is set to 14.3 minutes.

Figure 14:
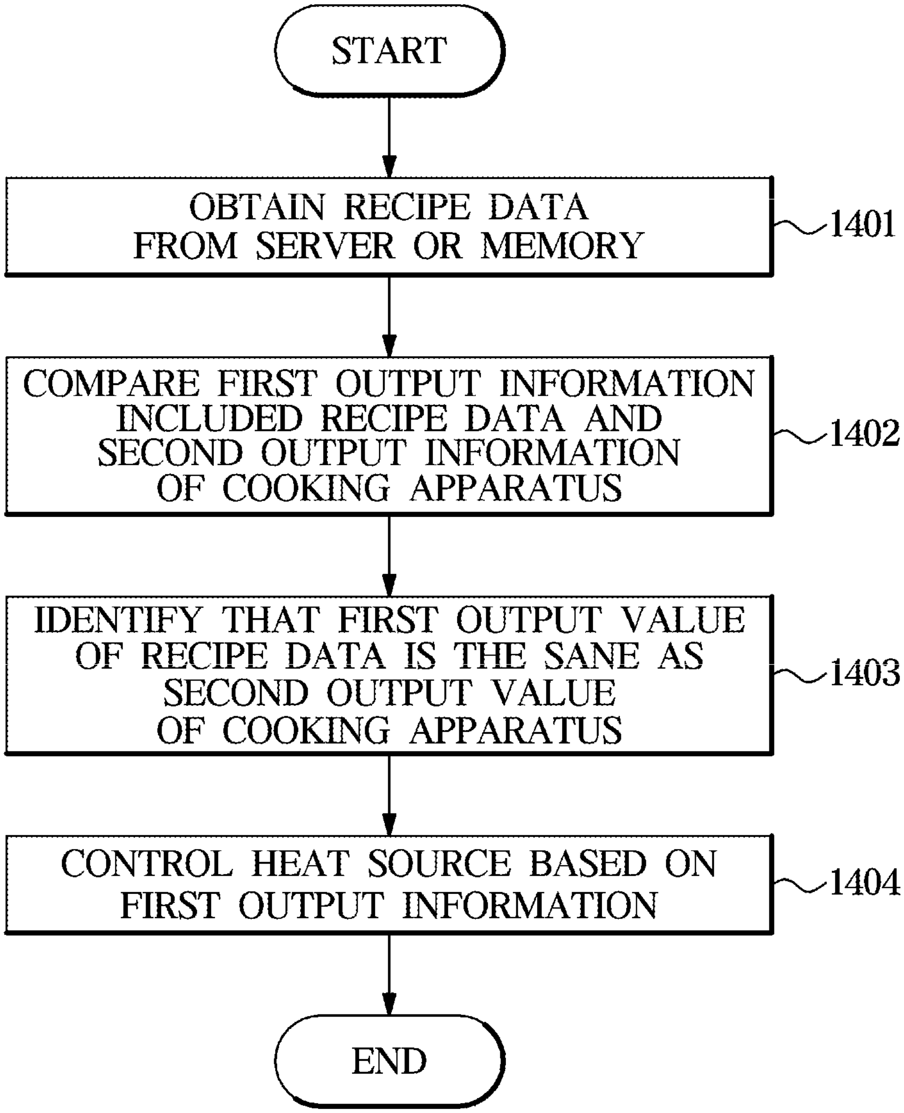
FIG. 14 is a flowchart illustrating a method for controlling a cooking apparatus by applying recipe data to an operation setting of a heat source according to an embodiment of this disclosure.

FIG. 14 is a flowchart illustrating a method for controlling a cooking apparatus by applying recipe data to an operation setting of a heat source according to an embodiment of this disclosure.

Referring to FIG. 14, the processor 610 may obtain the first output information from the recipe data obtained from the server or the recipe data stored in the memory 620 (1401), compare the first output information of the recipe data with the second output of the cooking apparatus 1 (1402), and identify that the first output value of the recipe data is the same as the second output value of the cooking apparatus 1 (1403).

When the first output value of the recipe data is the same as the second output value of the cooking apparatus 1, the processor 610 may control the heat source 100 based on the first output information of the recipe data (1404). In other words, when the power consumption of the device used to create the recipe data and the power consumption of the cooking apparatus 1 are the same, the cooking apparatus 1 may operate the heat source 100 by applying the recipe data as it is and perform cooking.

According to the cooking apparatus and the method of controlling the cooking apparatus according to the embodiments, the first output information of the recipe data and the second output information of the cooking apparatus may be compared, and the heat source may be automatically controlled so that the heat source of the cooking apparatus properly operates according to the comparison result. Accordingly, user convenience may be improved, and time and cost required to prepare different recipe data for each cooking apparatus having various specifications may be reduced.

According to the cooking apparatus and the method of controlling the cooking apparatus according to the embodiments, the setting information of the heat source may be changed so that the heat energy provided to the food by the heat source of the cooking apparatus is the same as the heat energy (output amount) provided to the food when the recipe data is generated. Through this, over-cook or under-cook may be prevented.

Meanwhile, the disclosed embodiments may be implemented in the form of a storage medium that stores instructions executable by a computer. The instruction may be stored in the form of a program code, and when executed by a processor, a program module may be generated to perform the operation of the disclosed embodiments.

As described above, the disclosed embodiments have been described with reference to the accompanying drawings. Although a few embodiments of the disclosure have been shown and described, it would be appreciated by those skilled in the art that changes may be made in these embodiments without departing from the principles and spirit of the disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A cooking apparatus comprising:
- a heat source configured to provide heat into a cooking chamber;
- a communication circuit configured to receive recipe data generated using a reference cooking apparatus from a server, wherein the recipe data includes first output information of the reference cooking apparatus;
- a memory configured to store second output information of the cooking apparatus; and
- a processor configured to:
  - identify a first power consumption of the reference cooking apparatus from the first output information,
  - obtain a difference between the first power consumption and a second power consumption of the cooking apparatus included in the second output information, and
  - based on the difference between the first power consumption and the second power consumption, change an on-off time of the heat source for repeating turning on and turning off of the heat source, and change an operation output of the heat source or determine a second cooking time different from a first cooking time of the recipe data,
  - wherein, when the first power consumption is less than the second power consumption, the processor is configured to determine the operation output of the heat source as the first power consumption.

2. The cooking apparatus according to claim 1, wherein, when the first power consumption is less than the second power consumption, the processor is configured to change the on-off time of the heat source within the first cooking time of the recipe data.

3. The cooking apparatus according to claim 1, wherein, when the first power consumption is greater than the second power consumption, the processor is configured to determine the second cooking time to be longer than the first cooking time of the recipe data.

4. The cooking apparatus according to claim 1, wherein, when the first power consumption and the second power consumption are the same, the processor is configured to control the heat source based on the first output information.

5. The cooking apparatus according to claim 1, further comprising:
- a sensor configured to identify a current applied to the heat source or a voltage applied to the heat source,
- wherein the processor is configured to obtain the second power consumption of the cooking apparatus based on the current or the voltage identified by the sensor.

6. The cooking apparatus according to claim 1, wherein:
- the heat source comprises a plurality of heaters disposed on a top surface of the cooking chamber; and
- the processor is configured to selectively change an operation setting of each of the plurality of heaters.

7. The cooking apparatus according to claim 6, wherein:
- the heat source further comprises a magnetron disposed under the cooking chamber and configured to provide a high frequency into the cooking chamber; and
- the processor is configured to selectively change the operation setting of each of the plurality of heaters and the magnetron.

8. The cooking apparatus according to claim 1, wherein:
- the heat source comprises multiple heaters configured to generate radiant heat,
- a first heater and a third heater of the multiple heaters are separated by a first distance,
- a second heater and a fourth heater of the multiple heaters are separated by the first distance,
- the first heater and the second heater are separated by a second distance that is larger than the first distance.

9. A method of controlling a cooking apparatus comprising:
- obtaining, by a processor, recipe data generated using a reference cooking apparatus from a server, wherein the recipe data includes first output information of the reference cooking apparatus; obtaining, by the processor, second output information of the cooking apparatus from a memory;
- identifying, by the processor, a first power consumption of the reference cooking apparatus from the first output information;
- obtaining, by the processor, a difference between the first power consumption and a second power consumption of the cooking apparatus included in the second output information; and
- based on the difference between the first power consumption and the second power consumption, changing an on-off time of a heat source for repeating turning on and turning off of the heat source, and changing an operation output of the heat source or determining a second cooking time different from a first cooking time of the recipe data,
- wherein the changing of the operation setting of the heat source comprises:
- when the first power consumption is less than the second power consumption, determining the operation output of the heat source as the first power consumption.

10. The method according to claim 9, wherein the changing of the operation setting of the heat source comprises:

when the first power consumption is less than the second power consumption, changing the on-off time of the heat source within the first cooking time of the recipe data.

11. The method according to claim 9, wherein the changing of the operation setting of the heat source comprises:

when the first power consumption is greater than the second power consumption, determining the second cooking time to be longer than the first cooking time of the recipe data.

12. The method according to claim 9, wherein the changing of the operation setting of the heat source comprises:

when the first power consumption and the second power consumption are the same, controlling the heat source based on the first output information.

13. The method according to claim 9, further comprising;

identifying, by a sensor, a current or voltage applied to the heat source; and obtaining, by the processor, the second power consumption of the cooking apparatus based on the identified current or voltage.

14. The method according to claim 9, wherein the changing of the operation setting of the heat source comprises:

selectively changing an operation setting of each of a plurality of heaters disposed on a top surface of a cooking chamber.

15. The method according to claim 9, wherein the changing of the operation setting of the heat source comprises:

selectively changing an operation setting of each of a plurality of heaters and a magnetron disposed under a cooking chamber.

16. The method according to claim 9, wherein:

the heat source comprises multiple heaters configured to generate radiant heat, a first heater and a third heater of the multiple heaters are separated by a first distance, a second heater and a fourth heater of the multiple heaters are separated by the first distance, the first heater and the second heater are separated by a second distance that is larger than the first distance.

* * * * *